US012658644B2

(12) United States Patent
Oda

(10) Patent No.: US 12,658,644 B2
(45) Date of Patent: Jun. 16, 2026

(54) CONNECTOR HAVING HOUSING AND TERMINAL HELD IN HOUSING, AND CONNECTOR ASSEMBLY

(71) Applicant: HIROSE ELECTRIC CO., LTD., Kanagawa (JP)

(72) Inventor: Kouhei Oda, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 391 days.

(21) Appl. No.: 18/348,035

(22) Filed: Jul. 6, 2023

(65) Prior Publication Data

US 2024/0022024 A1 Jan. 18, 2024

(30) Foreign Application Priority Data

Jul. 14, 2022 (JP) ................................ 2022-113381

(51) Int. Cl.
*H01R 13/639* (2006.01)
*H01R 13/514* (2006.01)

(52) U.S. Cl.
CPC ......... *H01R 13/639* (2013.01); *H01R 13/514* (2013.01)

(58) Field of Classification Search
CPC ...... H01R 12/716; H01R 12/73; H01R 13/26; H01R 13/514; H01R 13/639
USPC ........................................................... 439/74
See application file for complete search history.

(56) References Cited

U.S. PATENT DOCUMENTS 11,757,218 B2 * 9/2023 Hosoda ................ H01R 12/716 439/74
12,394,928 B2 * 8/2025 Aihara ................... H01R 12/91
2009/0176386 A1 * 7/2009 Wu ...................... H01R 12/716 439/74
2013/0273780 A1 * 10/2013 Kimura ................ H01R 13/514 439/626
2015/0140841 A1 * 5/2015 Watanabe .......... H01R 12/7011 439/74
2016/0248190 A1 * 8/2016 Matsuyama ....... H01R 13/6273
2017/0098900 A1 * 4/2017 Kobuchi .............. H01R 13/405
2020/0212615 A1 * 7/2020 Teruki ................. H01R 13/424

(Continued)

FOREIGN PATENT DOCUMENTS

JP 2017-69133 A 4/2017

*Primary Examiner* — Abdullah A Riyami
*Assistant Examiner* — Thang H Nguyen
(74) *Attorney, Agent, or Firm* — RANKIN, HILL & CLARK LLP

(57) ABSTRACT

Provided is a connector including a terminal and a housing, wherein the terminal includes a first mount portion, a first leg portion, a top portion, a second leg portion, a bottom portion, and an elastic portion, the terminal is configured to house a terminal of a partner connector in a fitting recessed portion formed by the second leg portion, the bottom portion, and the elastic portion, and the second leg portion and the elastic portion contact the terminal of the partner connector, a side wall portion of the housing extends in the fitting direction, and contacts or is provided close to the elastic portion of the terminal, the elastic portion of the terminal and the side wall portion of the housing are elastically deformed together in a lateral direction of the connector when the terminal of the partner connector is inserted into the fitting recessed portion of the terminal.

10 Claims, 8 Drawing Sheets

(56) References Cited

U.S. PATENT DOCUMENTS

| | | | | |
|---|---|---|---|---|
| 2021/0119386 | A1* | 4/2021 | Lee | H01R 12/716 |
| 2022/0140534 | A1* | 5/2022 | Hoshiba | H01R 13/6461<br>439/74 |

* cited by examiner

CONNECTOR HAVING HOUSING AND TERMINAL HELD IN HOUSING, AND CONNECTOR ASSEMBLY

CROSS-REFERENCE TO RELATED APPLICATION

This application claims priority from Japanese Patent Application No. 2022-113381 filed with the Japan Patent Office on Jul. 14, 2022, the entire content of which is hereby incorporated by reference.

BACKGROUND

1. Technical Field

The present disclosure relates to a connector and a connector assembly.

2. Related Art

Typically, various techniques regarding a connector having a terminal and a housing for connecting, e.g., a printed circuit board or a flexible flat cable have been known. For example, JP-A-2017-69133 discloses a connector including: a housing having a terminal housing portion opening upward in an upper-lower direction (fitting direction) and a bottom portion positioned on the lower side of the terminal housing portion; and a terminal having a base portion embedded and held in the bottom portion of the housing, a spring portion extending upward from the base portion and elastically deformably housed in the terminal housing portion, and a contact portion supported on the spring portion.

When a terminal of a partner connector is inserted into the terminal housing portion of the connector disclosed in JP-A-2017-69133, the terminal of the partner connector contacts the contact portion of the terminal of the connector, and the spring portion supporting the contact portion is elastically deformed in a lateral direction. In this manner, elastic force (equivalent to contact pressure) is provided to the terminal of the partner connector. Accordingly, the spring portion of the connector holds the terminal of the partner connector, and electric connection between the terminals of both the connectors is ensured.

SUMMARY

A connector of an embodiment of the present disclosure includes: a terminal; and a housing holding the terminal. The terminal includes a first mount portion, a first leg portion, a top portion, a second leg portion, a bottom portion, and an elastic portion. The housing includes a side wall portion. The first leg portion is formed continuously to the first mount portion, and extends in a first direction, which is one direction in a direction of fitting to a partner connector, from the first mount portion. The top portion is formed continuously to the first leg portion. The second leg portion is formed continuously to the top portion, and extends in a second direction, which is opposite to the first direction in the fitting direction, from the top portion. The bottom portion is formed continuously to the second leg portion. The elastic portion is formed continuously to the bottom portion, extends in the first direction from the bottom portion, and is elastically deformable in a lateral direction of the connector. The terminal is configured to house a terminal of the partner connector in a fitting recessed portion formed by the second leg portion, the bottom portion, and the elastic portion, and the second leg portion and the elastic portion contact the terminal of the partner connector when the terminal of the partner connector is housed in the fitting recessed portion. The side wall portion extends in the fitting direction, and contacts or is provided close to the elastic portion of the terminal. The elastic portion of the terminal and the side wall portion of the housing are elastically deformed together in the lateral direction when the terminal of the partner connector is inserted into the fitting recessed portion of the terminal.

DETAILED DESCRIPTION

Figure 1:
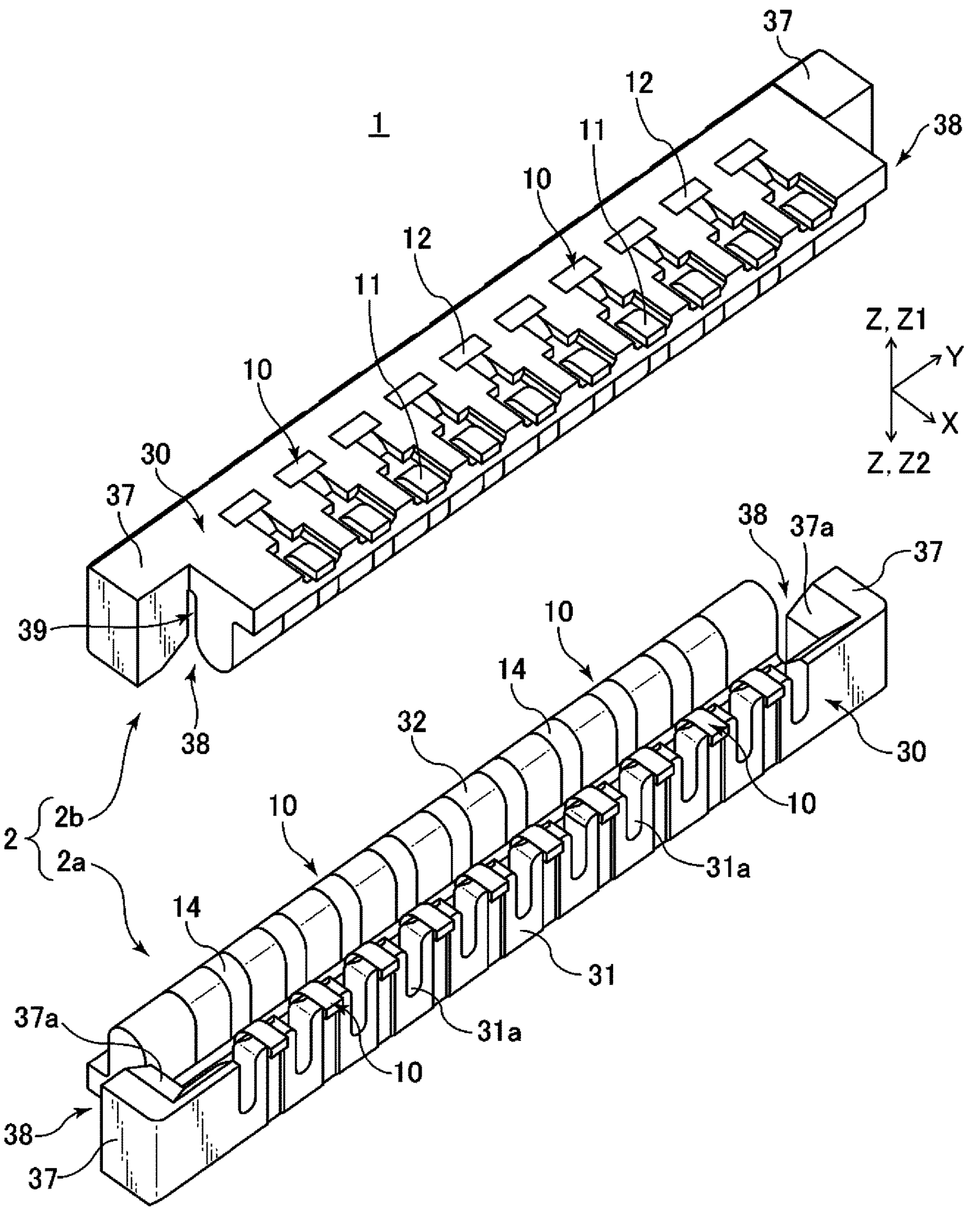
FIG. 1 is a perspective view of a connector assembly according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In recent years, the density of electronic components mounted on a printed circuit board has been increased due to, e.g., size reduction and function enhancement in electronic equipment such as a smart phone or a mobile phone, and accordingly, there has been a demand for size reduction in a connector itself. With size reduction in the connector, a terminal and a housing have also been extremely reduced in size.

As the above-described connector of JP-A-2017-69133 is reduced in size, the spring portion of the terminal becomes extremely small (thin) due to size reduction in the terminal. As a result, the elastic force of the spring portion of the terminal decreases, and it is difficult to provide sufficient contact pressure to the terminal of the partner connector. For this reason, electric connection between the terminals of the connectors cannot be ensured in some cases after the connectors have been repeatedly detached/attached, for example.

The present disclosure has been made for solving the above-described problems, and is intended to provide a connector and a connector assembly capable of properly ensuring contact pressure to be provided to a terminal even though the connector is reduced in size.

A connector of one embodiment of the present disclosure includes: a terminal; and a housing holding the terminal. The terminal includes a first mount portion, a first leg portion, a top portion, a second leg portion, a bottom portion, and an elastic portion. The housing includes a side wall portion. The first leg portion is formed continuously to the first mount portion, and extends in a first direction, which is one direction in a direction of fitting to a partner connector, from the first mount portion. The top portion is formed continuously to the first leg portion. The second leg portion is formed continuously to the top portion, and extends in a second direction, which is opposite to the first direction in the fitting direction, from the top portion. The bottom portion is formed continuously to the second leg portion. The elastic portion is formed continuously to the bottom portion, extends in the first direction from the bottom portion, and is elastically deformable in a lateral direction of the connector. The terminal is configured to house a terminal of the partner connector in a fitting recessed portion formed by the second leg portion, the bottom portion, and the elastic portion, and the second leg portion and the elastic portion contact the terminal of the partner connector when the terminal of the partner connector is housed in the fitting recessed portion. The side wall portion extends in the fitting direction, and contacts or is provided close to the elastic portion of the terminal. The elastic portion of the terminal and the side wall portion of the housing are elastically deformed together in the lateral direction when the terminal of the partner connector is inserted into the fitting recessed portion of the terminal.

According to the present disclosure, the contact pressure to be provided to the terminal can be properly ensured even though the connector is reduced in size.

Hereinafter, embodiments of the present disclosure will be described with reference to the drawings. Note that in all the figures for describing the embodiments, the same reference numerals are used to represent the same members in principle and repeated description thereof will be omitted. Moreover, each embodiment (also including modifications) will be independently described, but such description does not intended to exclude formation of a connector and a connector assembly by combination of components of these embodiments.

[Configurations of Connector and Connector Assembly]

Figure 2:
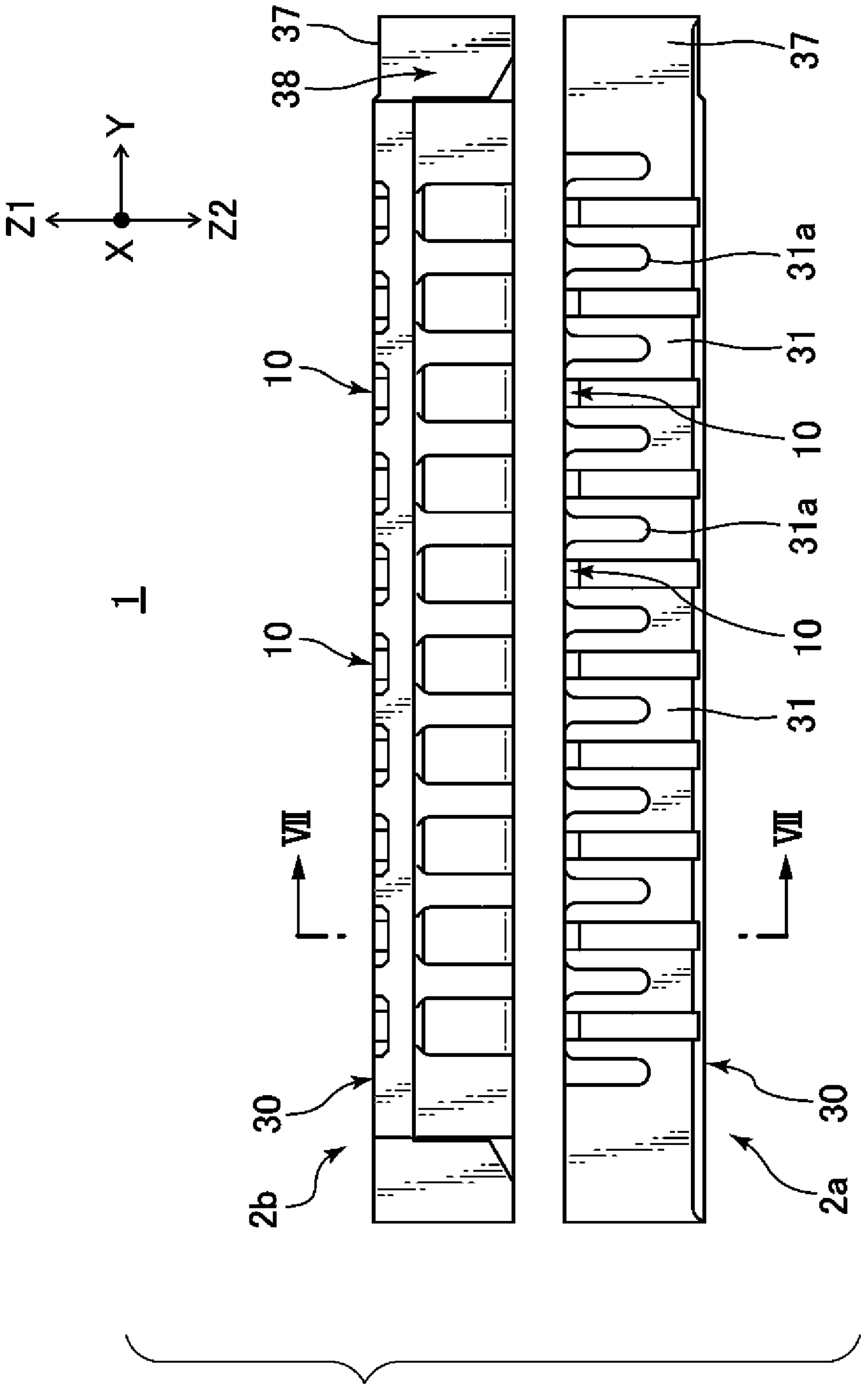
FIG. 2 is a side view of the connector assembly according to the embodiment of the present disclosure.
Figure 3:
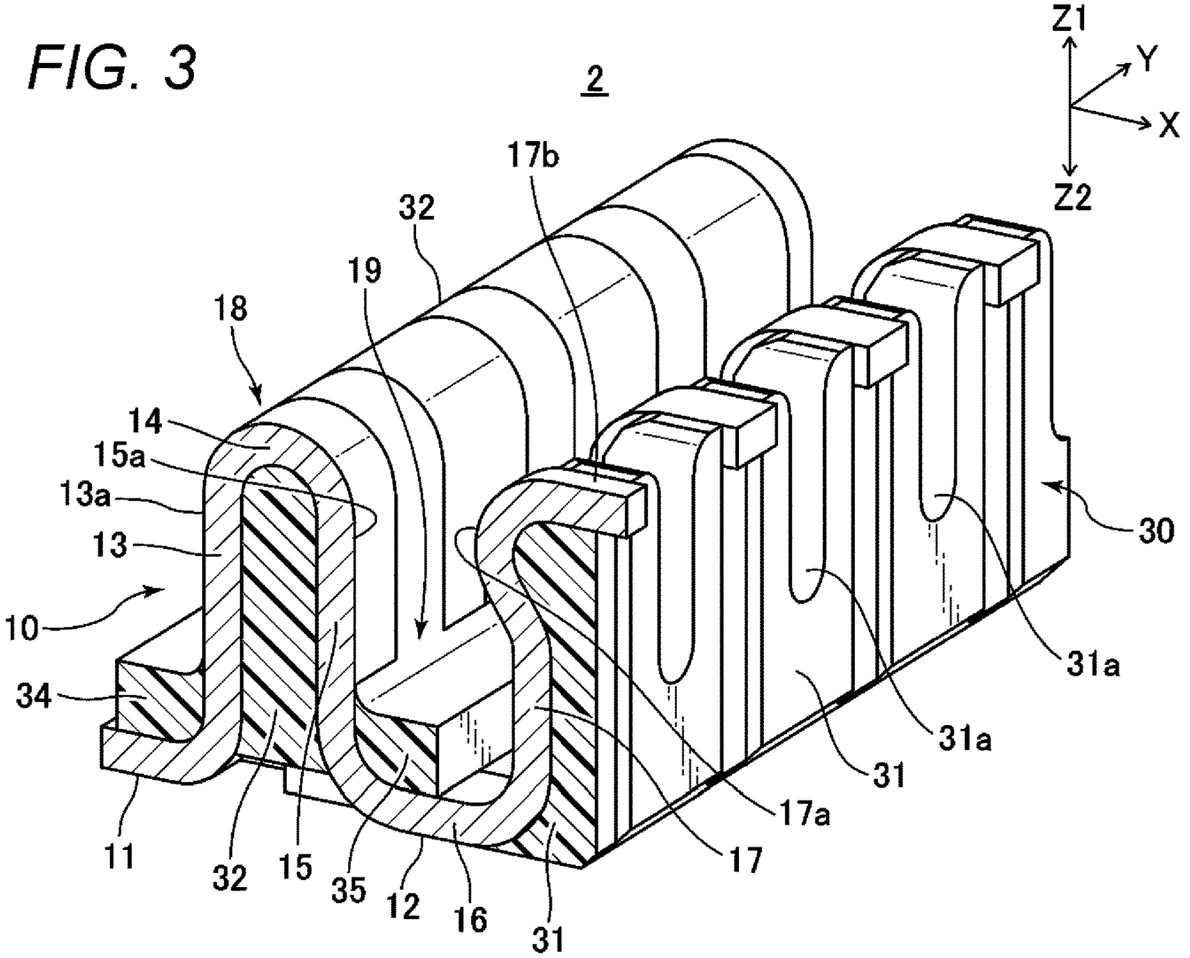
FIG. 3 is a perspective sectional view of part of a connector according to the embodiment of the present disclosure.
Figure 4:
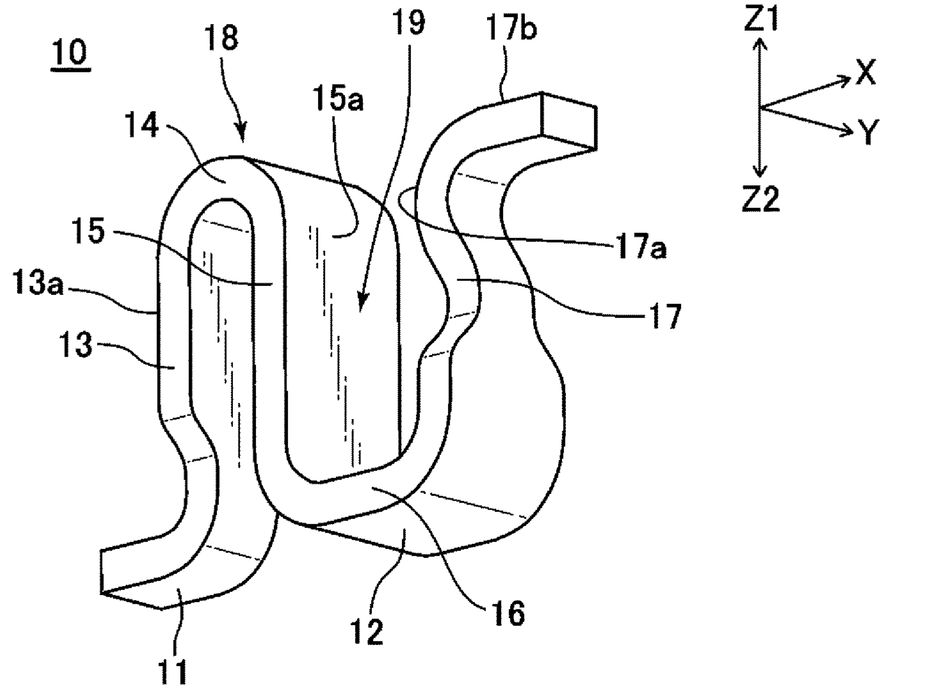
FIG. 4 is a perspective view of part of a terminal according to the embodiment of the present disclosure.
Figure 5:
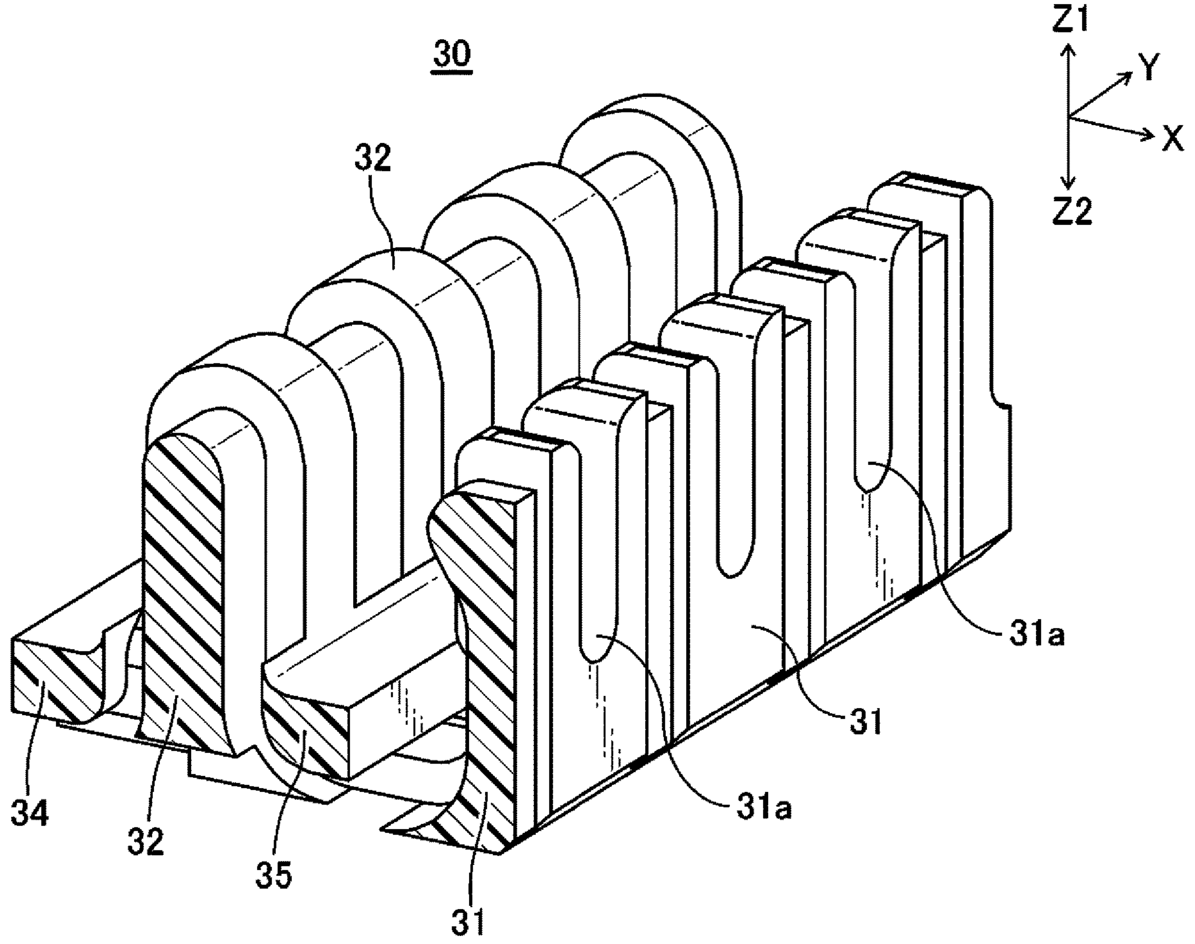
FIG. 5 is a perspective sectional view of part of a housing according to the embodiment of the present disclosure.
Figure 6:
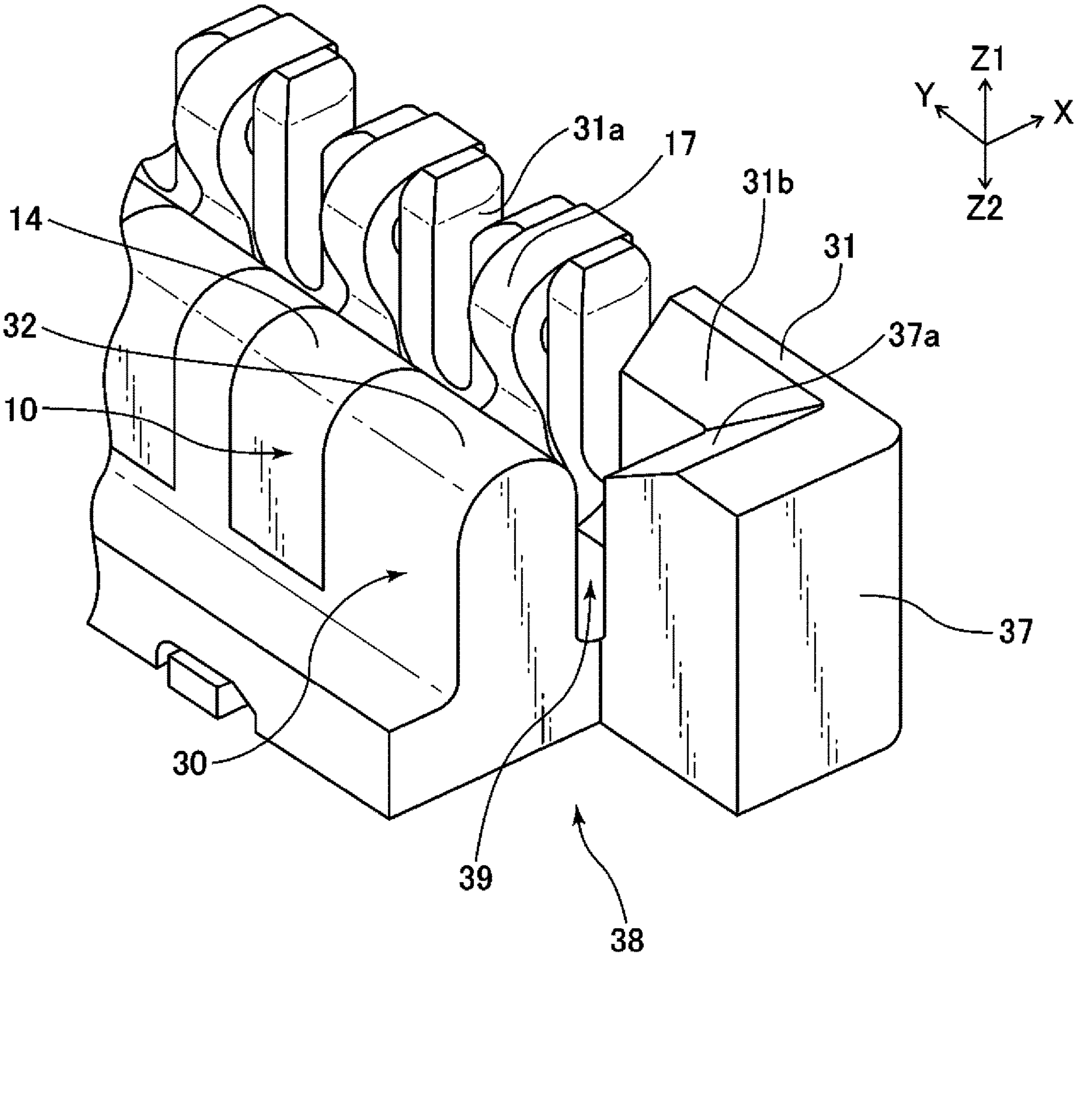
FIG. 6 is a perspective view of part of the connector according to the embodiment of the present disclosure.
Figure 7:
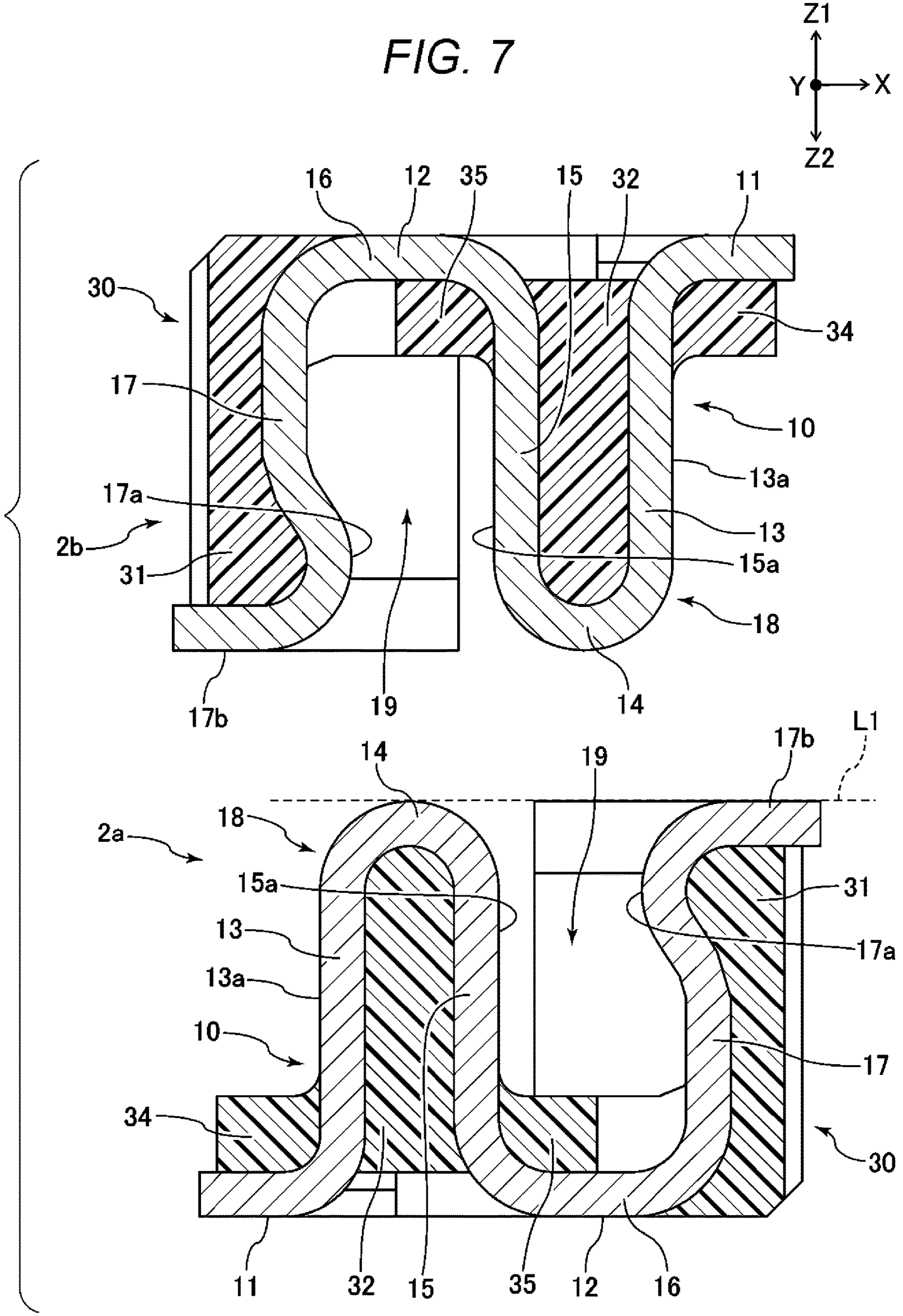
FIG. 7 is a sectional view of the connector assembly according to the embodiment of the present disclosure along a VII-VII line in FIG. 2.

First, the configurations of a connector and a connector assembly according to one embodiment of the present disclosure will be specifically described with reference to FIGS. 1 to 7. FIG. 1 is a perspective view showing the connector assembly according to the present embodiment diagonally from above. FIG. 2 is a side view showing the connector assembly according to the present embodiment along a lateral direction. FIG. 3 is a perspective sectional view showing part of the connector according to the present embodiment diagonally from above. FIG. 4 is a perspective view showing part of a terminal according to the present embodiment diagonally from below. FIG. 5 is a perspective sectional view showing part of a housing according to the present embodiment diagonally from above. FIG. 6 is a perspective view showing part (end portion in a longitudinal direction) of the connector according to the present embodiment diagonally from above. FIG. 7 is a sectional view of the connector assembly according to the present embodiment along a VII-VII line in FIG. 2.

First, a connector assembly 1 according to the present embodiment will be described with reference to FIGS. 1 and 2. As shown in these figures, the connector assembly 1 includes two connectors 2*a*, 2*b* (hereinafter merely referred to as a "connector(s) 2" when these connectors are not distinguished from each other) having the same shape and configured to be fittable to each other.

In FIG. 1, the lateral direction (width direction) of the connector 2 is shown as "X," the longitudinal direction (depth direction) of the connector 2 is shown as "Y," and the fitting direction (upper-lower direction) of the connector 2 is shown as "Z" (the same also applies to the other figures). In the present specification, in the fitting direction Z, the side of a certain connector 2 receiving a partner connector 2 will be defined as "upper" or "front" (equivalent to a "first direction" in the present disclosure), and the side of the certain connector 2 attached to, e.g., a board will be defined as "lower" or "back" (equivalent to a "second direction" in the present disclosure). For the connector 2*a* on the lower side in FIG. 1, a direction indicated by "Z1" in the fitting direction Z is equivalent to an "upper direction," and a direction indicated by "Z2" in the fitting direction Z is equivalent to a "lower direction." On the other hand, for the connector 2*b* on the upper side in FIG. 1, a direction indicated by "Z1" in the fitting direction Z is equivalent to a "lower direction," and a direction indicated by "Z2" in the fitting direction Z is equivalent to an "upper direction." Note that in FIGS. 3 to 6 described later, the connector 2*a* on the lower side in FIG. 1 is shown as an example.

As shown in FIGS. 1 and 2, the connector 2 mainly has terminals 10 and a housing 30 holding the terminals 10. The two connectors 2*a*, 2*b* are so-called hermaphroditic connectors having both the terminals 10 and the housings 30 that are identically shaped (also see FIG. 7). Moreover, the connector 2 extends in the longitudinal direction Y, and the multiple terminals 10 arrayed at an equal interval along the longitudinal direction Y are held on the housing 30. Such a connector 2 is formed, by integral molding, using a conductive member forming the terminals 10, such as copper alloy, and resin forming the housing 30, such as liquid polymer (LCP). Specifically, the terminals 10 are insert-molded into the housing 30.

For example, the connector 2 may be used as an internal component in small electronic equipment such as a mobile phone, a smart phone, a digital camera, or a laptop computer. Moreover, the connector 2 is mounted on a not-shown predetermined member such as a printed circuit board or a flexible flat cable. For example, the connector 2 is formed with a length of 1 mm or less (about 0.5 mm as one example) in the lateral direction X and the fitting direction Z and a length of 5 mm or less in the longitudinal direction Y.

Next, the terminal 10 of the connector 2 according to the present embodiment will be described with reference to FIGS. 3, 4, and 7 (note that FIGS. 3 and 4 show the connector 2*a* shown in FIG. 1 as an example of the connector 2). As shown in these figures, the terminal 10 of the connector 2 mainly has, as component parts, mount portions 11, 12, a first leg portion 13, a top portion 14, a second leg portion 15, a bottom portion 16, and an elastic portion 17, and these component parts are formed along the lateral direction X. The mount portions 11, 12 are portions exposed at the lower surface of the connector 2 (also see FIG. 1) and provided for connecting the terminal 10 to, e.g., the board by soldering. Note that the mount portion 12 is formed by a back portion of the bottom portion 16 of the terminal 10. Moreover, in description below, the mount portion 11 will be sometimes referred to as a first mount portion, and the mount portion 12 will be sometimes referred to as a second mount portion.

The first leg portion 13 is formed continuously to the mount portion 11, and extends in the upper direction Z1 from the mount portion 11. The top portion 14 is formed continuously to the first leg portion 13. The second leg portion 15 is formed continuously to the top portion 14, and extends in the lower direction Z2 from the top portion 14. The bottom portion 16 is formed continuously to the second leg portion 15. The elastic portion 17 is formed continuously to the bottom portion 16, extends in the upper direction Z1 from the bottom portion 16, and is elastically deformable in the lateral direction X. The top portion 14 and an upper end portion 17*b* of the elastic portion 17 are at the substantially same position in the fitting direction (upper-lower direction) Z (specifically see a dashed line L1 in FIG. 7).

Note that the end portion 17*b* of the elastic portion 17 is formed so as to extend in the lateral direction X and this is for position alignment in integral molding and proper holding of the terminal 10 in a mold. In addition, the elastic portion 17 is formed such that the width thereof in the longitudinal direction Y decreases in the upper direction Z1 (specifically see FIG. 4), and this configuration is for firmly fixing the terminal 10 in the mold in insert molding. Specifically, this configuration is for firmly fixing a portion, where the width in the longitudinal direction Y changes from a narrow width to a wide width, of the elastic portion 17 with the mold.

In the terminal 10, the first leg portion 13, the top portion 14, and the second leg portion 15 form a substantially inverted U-shaped fitting raised portion 18 protruding in the upper direction Z1. On the other hand, the second leg portion 15, the bottom portion 16, and the elastic portion 17 form a fitting recessed portion 19 having a substantially U-shape recessed in the lower direction Z2 and opening on the upper direction Z1 side. In the connector assembly 1, the fitting recessed portion 19 of the terminal 10 of one connector 2*a* houses the fitting raised portion 18 of the terminal 10 of the other connector 2*b*, and the fitting recessed portion 19 of the terminal 10 of the other connector 2*b* houses the fitting raised portion 18 of the terminal 10 of one connector 2*a*. With this configuration, the connectors 2*a*, 2*b* are fitted to each other. In this fitting state, contact portions 13*a*, 15*a*, 17*a* formed at the outer surfaces of the first leg portions 13, the second leg portions 15, and the elastic portions 17 in both the connectors 2*a*, 2*b* contact each other, and accordingly, electric connection between the terminals 10 of the connectors 2*a*, 2*b* is made.

Next, the housing 30 of the connector 2 according to the present embodiment will be described with reference to FIGS. 3, 5, 6, and 7 (note that FIGS. 3, 5, and 6 show the connector 2*a* shown in FIG. 1 as an example of the connector 2). As shown in these figures, the housing 30 of the connector 2 has a side wall portion 31 formed so as to extend in the fitting direction (upper-lower direction) Z and contacting the outside of the elastic portion 17 of the terminal 10. The side wall portion 31 extends in the longitudinal direction Y so as to contact the elastic portions 17 of the multiple terminals 10 (also see FIGS. 1 and 2). Moreover, the side wall portion 31 is formed, between adjacent ones of the elastic portions 17 of the multiple terminals 10, with a slit portion 31*a* which extends in the lower direction Z2 from an upper end portion of the side wall portion 31.

Since the side wall portion 31 of the housing 30 as described above contacts the outside of the elastic portion 17 of the terminal 10 in the lateral direction X and is made of resin as described above, the side wall portion 31 is elastically deformable in the lateral direction X together with the elastic portion 17 of the terminal 10. Specifically, when the fitting raised portion 18 of the terminal 10 of the other connector 2*b* is inserted into the fitting recessed portion 19 of the terminal 10 of one connector 2*a*, both the elastic portion 17 of the terminal 10 and the side wall portion 31 of the housing 30 in one connector 2*a* are elastically deformed in the lateral direction X in synchronization with each other. The same also applies to a case where the fitting raised portion 18 of the terminal 10 of one connector 2*a* is inserted into the fitting recessed portion 19 of the terminal 10 of the other connector 2*b*.

The housing 30 further has a holding wall 32 holding the first leg portion 13, top portion 14, and second leg portion 15 (i.e., fitting raised portion 18) of the terminal 10. A space formed inside the first leg portion 13, the top portion 14, and the second leg portion is filled with resin, and such a portion filled with the resin forms the holding wall 32. Moreover, the holding wall 32 is formed so as to fill a clearance in the longitudinal direction Y in each of the fitting raised portions 18 of the multiple terminals 10. The holding wall 32 described above reduces displacement of the fitting raised portion 18 of the terminal 10 in the lateral direction X upon fitting of the connectors 2*a*, 2*b*. Further, the housing 30 has a cover portion 34 covering the front side of the mount portion 11 of the terminal 10 and a cover portion 35 covering part of the front side of the bottom portion 16 (corresponding to the mount portion 12) of the terminal 10. These cover portions 34, 35 reduce leakage of solder provided onto the mount portions 11, 12 on the back side of the terminal 10 to the front side (e.g., first leg portion 13, second leg portion 15, and elastic portion 17) of the terminal 10. When the connector 2*a* and the connector 2*b* are fitted to each other, the end portion 17*b* of the connector 2*b* contacts the cover portion 34 of the connector 2*a*, and similarly, the end portion 17*b* of the connector 2*a* contacts the cover portion 34 of the connector 2*b*. Accordingly, a position in the fitting direction Z in a regular fitting state is defined.

As shown in FIGS. 1 and 6, the housing 30 further has, at each end portion in the longitudinal direction Y, a protruding portion 37 protruding in the longitudinal direction Y and extending in the fitting direction (upper-lower direction) Z and a cutout portion 38 formed adjacent to the lateral direction X side of the protruding portion 37. The protruding portion 37 is formed continuously to the side wall portion 31, and is formed apart from the holding wall 32. The cutout portion 38 faces the holding wall 32, and is formed with the substantially same sizes in the directions X, Y, Z as those of the protruding portion 37. When the connectors 2*a*, 2*b* are fitted to each other, the protruding portion 37 of the housing 30 of the connector 2*a* and the cutout portion 38 of the housing 30 of the connector 2*b* engage with each other (in other words, the protruding portion 37 is fitted in the cutout portion 38), and the cutout portion 38 of the housing 30 of the connector 2*a* and the protruding portion 37 of the housing 30 of the connector 2*b* engage with each other. As shown in FIG. 6, guide portions 31*b*, 37*a* inclined in the lower direction Z2 are each formed at an upper end portion (specifically upper end portion at each end of the side wall portion 31 in the longitudinal direction Y) of the side wall portion 31 of the housing 30 and an upper end portion of the protruding portion 37, and function to guide the connectors 2*a*, 2*b* such that the connectors 2*a*, 2*b* are aligned with each other upon fitting thereof.

Further, as shown in FIGS. 1 and 6, the housing 30 has a clearance 39 formed between an end portion of the holding wall 32 in the longitudinal direction Y and the protruding portion 37. The clearance 39 is formed continuously to the cutout portion 38, and functions as a backlash between the holding wall 32 and the protruding portion 37 when the connectors 2*a*, 2*b* are fitted to each other. If the holding wall 32 and the protruding portion 37 are coupled to each other without such a clearance 39, such a coupled portion might interfere with fitting of the connectors 2*a*, 2*b* (specifically fitting of the protruding portion 37 of one connector 2 and the cutout portion 38 of the other connector 2). For this reason, the clearance 39 is provided so that the protruding portion 37 and the cutout portion 38 can smoothly engage with each other when the connectors 2*a*, 2*b* are fitted to each other.

Figure 8:
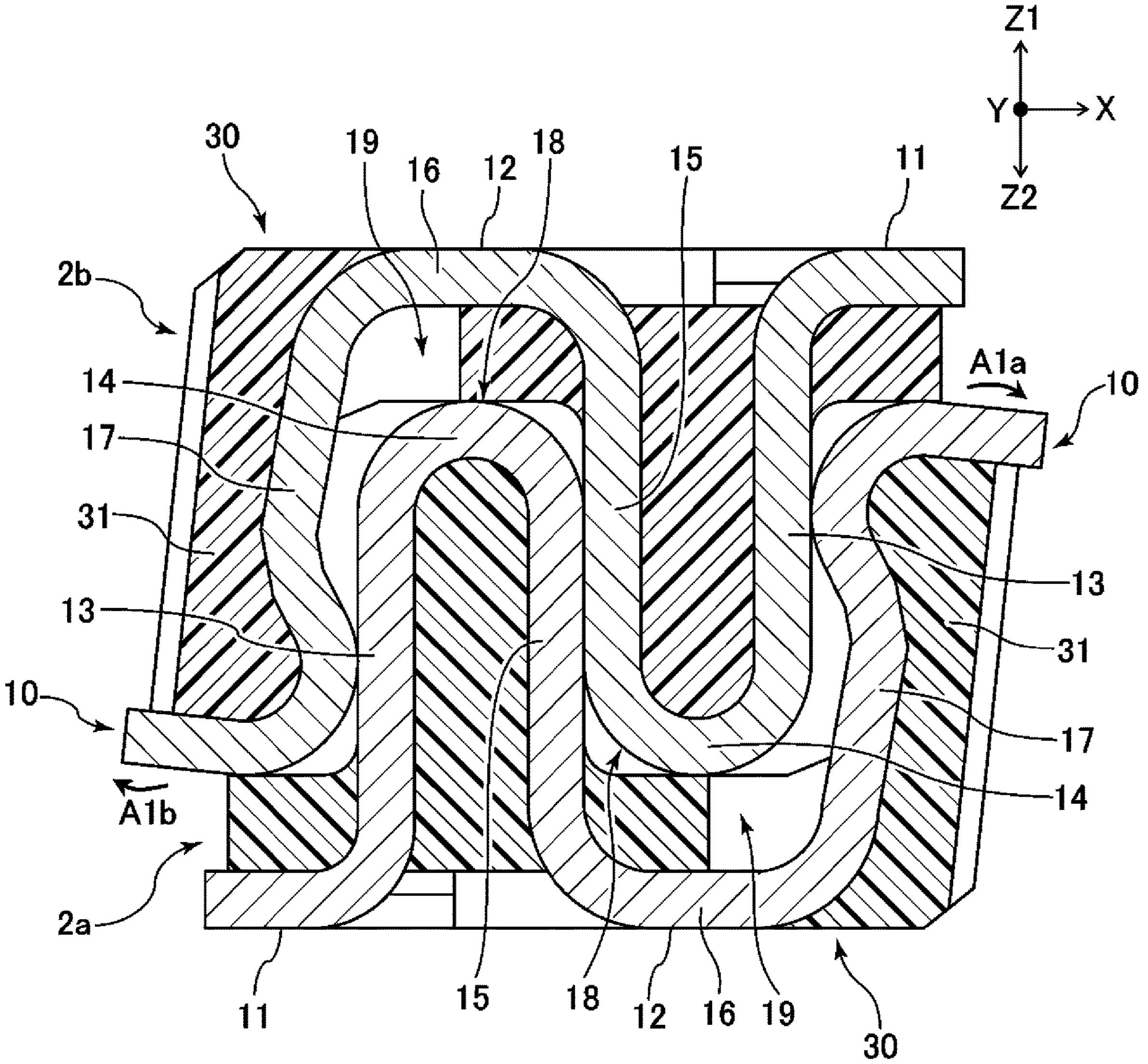
FIG. 8 is a sectional view showing the state of fitting of the connectors according to the embodiment of the present disclosure.

Next, the state of fitting of the connectors 2*a*, 2*b* according to the present embodiment will be described with reference to FIG. 8. FIG. 8 is a sectional view showing the fitted connectors 2*a*, 2*b* along the fitting direction Z. Upon fitting of the connectors 2*a*, 2*b*, the fitting raised portion 18 of the other connector 2*b* is inserted into the fitting recessed portion 19 of one connector 2*a*. At this point, the elastic portion 17 of the terminal 10 of the connector 2*a* is pushed by the first leg portion 13 of the fitting raised portion 18 of the connector 2*b*, and is deformed in the lateral direction X as indicated by an arrow A1*a*. In addition, the side wall portion 31 of the housing 30 of the connector 2*a* is also pushed by the elastic portion 17 contacting the side wall portion 31, and is deformed in the lateral direction X as indicated by the arrow A1*a*.

That is, in the connector 2*a*, both the elastic portion 17 of the terminal 10 and the side wall portion 31 of the housing 30 are deformed together in the lateral direction X. The fitting raised portion 18 of the connector 2*b* is pushed to the second leg portion 15 side of the connector 2*a* by a force of the elastic portion 17 and side wall portion 31 of the connector 2*a* returning to original shapes, and accordingly, the terminal 10 of the connector 2*a* and the terminal 10 of the connector 2*b* are electrically connected to each other at the fitting recessed portion 19 and the fitting raised portion 18. In this case, the contact portion 15*a* of the second leg portion 15 and the contact portion 17*a* of the elastic portion 17 of the terminal 10 of the connector 2*a* each contact the contact portion 15*a* of the second leg portion 15 and the contact portion 13*a* of the first leg portion 13 of the terminal 10 of the connector 2*b* (also see, e.g., FIG. 7). Note that the contact area of the contact portion 17*a* of the elastic portion 17 of the terminal 10 of the connector 2*a* is formed small so that reliability in a state of contacting the terminal 10 of the partner connector 2*b* can be improved.

Further, upon fitting of the connectors 2*a*, 2*b*, the fitting raised portion 18 of one connector 2*a* is also inserted into the fitting recessed portion 19 of the other connector 2*b*. At this point, the elastic portion 17 of the terminal 10 of the connector 2*b* is pushed by the first leg portion 13 of the fitting raised portion 18 of the connector 2*a*, and is deformed in the lateral direction X as indicated by an arrow A1*b*. In addition, the side wall portion 31 of the housing 30 of the connector 2*b* is also pushed by the elastic portion 17 contacting the side wall portion 31, and is deformed in the lateral direction X as indicated by the arrow A1*b*.

That is, in the connector 2*b*, both the elastic portion 17 of the terminal 10 and the side wall portion 31 of the housing 30 are deformed together in the lateral direction X. The fitting raised portion 18 of the connector 2*a* is pushed to the second leg portion 15 side of the connector 2*b* by a force of the elastic portion 17 and side wall portion 31 of the connector 2*b* returning to original shapes, and accordingly, the terminal 10 of the connector 2*b* and the terminal 10 of the connector 2*a* are electrically connected to each other at the fitting recessed portion 19 and the fitting raised portion 18. In this case, the contact portion 15*a* of the second leg portion 15 and the contact portion 17*a* of the elastic portion 17 of the terminal 10 of the connector 2*b* each contact the contact portion 15*a* of the second leg portion 15 and the contact portion 13*a* of the first leg portion 13 of the terminal 10 of the connector 2*a* (also see, e.g., FIG. 7). Note that the contact area of the contact portion 17*a* of the elastic portion 17 of the terminal 10 of the connector 2*b* is formed small so that reliability in a state of contacting the terminal 10 of the partner connector 2*a* can be improved.

[Features and Advantageous Effects]

Next, features and advantageous effects of the connector 2 and the like according to the above-described present embodiment will be described.

In the connector 2 according to the present embodiment, the terminal 10 includes the mount portion 11 mounted on the predetermined member, the first leg portion 13 formed continuously to the mount portion 11 and extending in the upper direction from the mount portion 11, the top portion 14 formed continuously to the first leg portion 13, the second leg portion 15 formed continuously to the top portion 14 and extending in the lower direction from the top portion 14, the bottom portion 16 formed continuously to the second leg portion 15, and the elastic portion 17 formed continuously to the bottom portion 16, extending in the upper direction from the bottom portion 16, and formed elastically deformable in the lateral direction X. The terminal 10 is configured to house the terminal of the partner connector 2 in the fitting recessed portion 19 formed by the second leg portion 15, the bottom portion 16, and the elastic portion 17, and when the terminal 10 of the partner connector 2 is housed in the fitting recessed portion 19, contacts the terminal 10 of the partner connector 2 at the second leg portion 15 and the elastic portion 17. The housing 30 includes at least the side wall portion 31 formed so as to extend in the fitting direction Z and contacting the elastic portion 17 of the terminal 10, and when the terminal of the partner connector 2 is inserted into the fitting recessed portion 19 of the terminal the elastic portion 17 of the terminal 10 and the side wall portion 31 of the housing 30 are elastically deformed together in the lateral direction X.

According to the connector 2 of the present embodiment as described above, the side wall portion 31 contacting the elastic portion 17 is provided in the housing 30 in addition to the elastic portion 17 of the terminal 10. Thus, when the terminal 10 of the partner connector 2 is inserted into the fitting recessed portion 19 of the terminal 10, both the elastic portion 17 of the terminal 10 and the side wall portion 31 of the housing 30 are elastically deformed together in the lateral direction X. Accordingly, both the elastic portion 17 of the terminal 10 and the side wall portion 31 of the housing 30 generate elastic force, and therefore, sufficient contact pressure can be provided to the terminal 10 of the partner connector 2. In other words, the contact pressure to be provided can be enhanced. Thus, even when the connector 2 is reduced in size, the contact pressure to be provided to the terminal 10 can be properly ensured. Consequently, even when the connector 2 is repeatedly detached/attached, sufficient contact pressure can be continuously provided and electric connection between the terminals of the connectors 2 can be ensured, for example.

The connector 2 according to the present embodiment has the multiple terminals arrayed along the longitudinal direction Y, the side wall portion 31 of the housing 30 extends along the longitudinal direction Y so as to contact the elastic portions 17 of the multiple terminals 10, and the slit portion 31*a* is formed between adjacent ones of the elastic portions 17 of the multiple terminals 10. With the slit portions 31*a* provided in the side wall portion 31 as described above, the side wall portion 31 can properly provide desired contact pressure in just proportion. In this case, the size (specifically length of a portion cut out from the side wall portion 31 in the longitudinal direction Y and/or the fitting direction Z) or shape of the slit portion 31*a* provided in the side wall portion 31 may be designed such that the desired contact pressure (i.e., elastic force) is provided.

The connector 2 according to the present embodiment is fittable to the partner connector 2 formed such that the shape of the entirety of the partner connector 2 including the terminal 10 and the housing 30 is the same as that of the connector 2. That is, in the present embodiment, the connector assembly 1 includes the two connectors 2*a*, 2*b* having the same shape. With this configuration, it is not necessary to prepare, e.g., different molds for manufacturing the two connectors 2*a*, 2*b*, and therefore, a manufacturing cost can be reduced.

In the connector 2 according to the present embodiment, the housing 30 includes, at the end portion in the longitudinal direction Y, the protruding portion 37 protruding in the longitudinal direction Y and extending in the fitting direction Z and the cutout portion 38 formed adjacent to the protruding portion 37. One connector 2 is fitted to the partner connector 2 in such a manner that the protruding portion 37 of the housing 30 of the one connector 2 and the cutout portion 38 of the housing 30 of the other connector 2 engage with each other and the cutout portion 38 of the housing 30 of the one connector 2 and the protruding portion 37 of the housing 30 of the other connector 2 engage with each other. With this configuration, these two connectors 2 can be easily aligned with each other when the two connectors 2 are fitted to each other.

In the connector 2 according to the present embodiment, the housing 30 includes the holding wall 32 holding the first leg portion 13, top portion 14, and second leg portion 15 of the terminal 10, and the clearance 39 is formed between the end portion of the holding wall 32 in the longitudinal direction Y and the protruding portion 37. The clearance 39 functions as the backlash between the holding wall 32 and the protruding portion 37 when the connectors 2*a*, 2*b* are fitted to each other. Thus, such a clearance 39 allows the protruding portion 37 and the cutout portion 38 to smoothly engage with each other when the connectors 2*a*, 2*b* are fitted to each other.

In the connector 2 according to the present embodiment, the terminal 10 is configured such that the back (lower) portion of the bottom portion 16 forms the mount portion 12 (second mount portion). The connector 2 is mounted on, e.g., the board using the mount portion 12 in addition to the above-described mount portion 11 (first mount portion) so that the connector 2 can be fixed onto, e.g., the board with favorable balance.

In the connector 2 according to the present embodiment, the top portion 14 of the terminal 10 and the upper end portion 17*b* of the elastic portion 17 of the terminal 10 are at the substantially same position in the fitting direction Z. The heights of the protruding portions of the connector 2 are aligned with each other so that the two connectors 2 can be fitted to each other with favorable balance.

[Modifications]

Next, modifications of the above-described embodiment will be described.

In the above-described embodiment, the multiple slit portions 31*a* provided across the longitudinal direction Y in the side wall portion 31 of the housing 30 have the same size and shape, but the present disclosure is not limited to this configuration. In one modification, the slit portion 31*a* may be formed smaller toward the center of the connector 2 in the longitudinal direction Y. In another modification, the slit portion 31*a* may be formed larger toward the center of the connector 2 in the longitudinal direction Y. In still another modification, relatively-larger slit portions 31*a* and relatively-smaller slit portions 31*a* may be alternately formed in the longitudinal direction Y. The multiple slit portions 31*a* are formed with various sizes or shapes as described above so that the contact pressure to be provided by the side wall portion 31 can be finely set.

In the above-described embodiment, in the connector 2, the side wall portion 31 of the housing 30 contacts (in other words, closely contacts) the elastic portion 17 of the terminal 10, but does not necessarily contact the elastic portion 17 of the terminal 10. In a modification, the side wall portion 31 of the housing 30 may be provided close to the elastic portion 17 of the terminal 10. In this modification, the side wall portion 31 may be provided close to the elastic portion 17 to such an extent that the elastic portion 17 of the terminal 10 firmly contacts the side wall portion 31 of the housing 30 when the elastic portion 17 is elastically deformed in the lateral direction X.

In the above-described embodiment, the connector 2 is fittable to the partner connector 2 formed such that the shape of the entirety of the partner connector 2 including the terminal 10 and the housing 30 is the same as that of the connector 2. That is, the connector assembly 1 includes the two connectors 2*a*, 2*b* having the same shape. The present disclosure is not limited to a case of the two connectors 2*a*, 2*b* having exactly the same shape as described above, and in one modification, the two connectors 2*a*, 2*b* may be formed with the substantially same shape as a whole.

In another modification, the connector 2 may be fittable to the partner connector 2 formed in such a manner that: the shape of the entirety of the partner connector 2 including the terminal 10 and the housing 30 is not the substantially same as that of the connector 2, but at least the shapes of the first leg portion 13, top portion 14, second leg portion 15, bottom portion 16, and elastic portion 17 (i.e., portions involved in fitting) of the terminal 10 are the substantially same as those of the connector 2. In this case, the connector assembly 1 includes the two connectors 2*a*, 2*b* having the substantially same shape at the portions involved in fitting.

Figure 9:
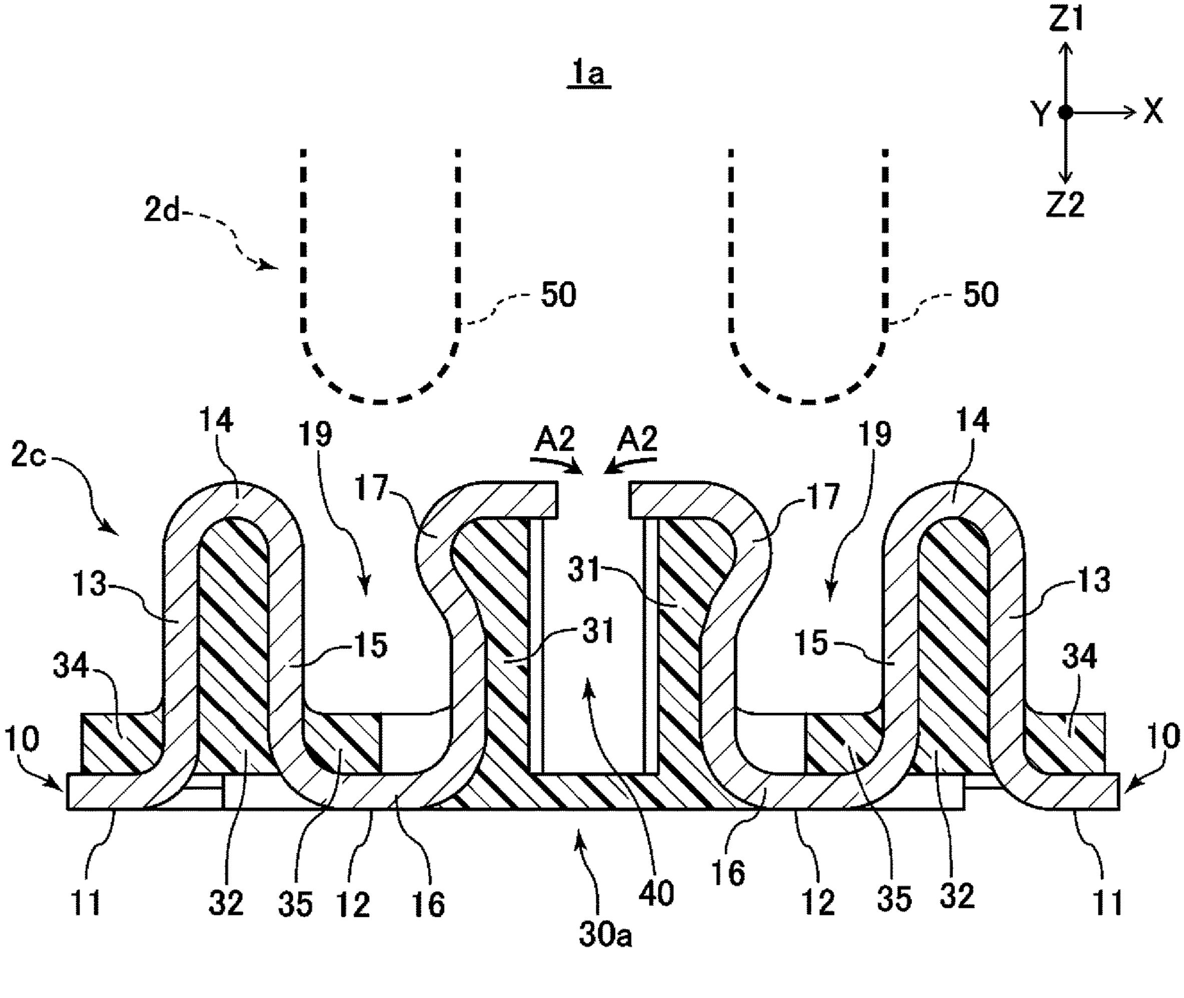
FIG. 9 is a sectional view of a connector assembly according to a modification of the embodiment of the present disclosure.

In still another modification, the two connectors 2*a*, 2*b* do not necessarily have the substantially same shape as in the above-described embodiment and modifications. One example of this modification will be described with reference to FIG. 9. FIG. 9 is a sectional view showing a connector assembly 1*a* according to the modification of the present embodiment along the fitting direction Z. In the connector assembly 1*a*, a connector 2*c* which is a receptacle connector and a connector 2*d* which is a plug connector are fitted to each other. Note that in FIG. 9, only part of terminals 50 of the connector 2*d* is indicated by dashed lines.

As shown in FIG. 9, the connector 2*c* has two pairs of the above-described terminal 10 and the above-described housing 30. Specifically, the connector 2*c* includes a pair of terminals 10 arranged so as to symmetrically face each other in the lateral direction X and a housing 30*a* having a pair of housings 30 arranged and coupled so as to symmetrically face each other in the lateral direction X to hold the pair of terminals 10. The housing 30*a* continuously extends in the lateral direction X so as to hold both the pair of terminals 10 arranged in the lateral direction X. Specifically, in the housing 30*a* of the connector 2*c*, a pair of side wall portions 31 is apart from each other in the lateral direction X, and a space 40 is formed between the pair of side wall portions 31 apart from each other.

In the connector 2*c* described above, each terminal 50 of the connector 2*d* is inserted into a corresponding one of fitting recessed portions 19 of the pair of terminals 10, and in this manner, the connectors 2*c*, 2*d* are fitted to each other. At this point, each of elastic portions 17 of the pair of terminals 10 of the connector 2*c* is pushed by a corresponding one of the terminals 50 of the connector 2*d*, and each of the pair of side wall portions 31 contacting these elastic portions 17 is also pushed via a corresponding one of the elastic portions 17. In this case, since the space 40 is formed between the pair of side wall portions 31 as described above, each pair of the elastic portions 17 and each pair of the side wall portions 31 are deformable together in the lateral direction X as indicated by arrows A2.

Note that the embodiments of the present disclosure are not independent of each other, but may be implemented in combination as necessary. Moreover, the above-described embodiments are examples describing the present disclosure, and the present disclosure is not limited to these embodiments. The present disclosure may be implemented in various forms without departing from the gist of the present disclosure.

The connector and the connector assembly according to the present disclosure can be utilized for the purpose of, e.g., connecting boards to each other through a flat cable in electronic equipment that transmits an electric signal at a high speed, such as a smart phone or a mobile phone.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A connector comprising:

a terminal; and a housing holding the terminal, wherein the terminal includes a first mount portion, a first leg portion, a top portion, a second leg portion, a bottom portion, and an elastic portion, the housing includes a side wall portion, the first leg portion is formed continuously to the first mount portion, and extends in a first direction, which is one direction in a direction of fitting to a partner connector, from the first mount portion, the top portion is formed continuously to the first leg portion, the second leg portion is formed continuously to the top portion, and extends in a second direction, which is opposite to the first direction in the fitting direction, from the top portion, the bottom portion is formed continuously to the second leg portion, the elastic portion is formed continuously to the bottom portion, extends in the first direction from the bottom portion, and is elastically deformable in a lateral direction of the connector, the terminal is configured to house a terminal of the partner connector in a fitting recessed portion formed by the second leg portion, the bottom portion, and the elastic portion, and the second leg portion and the elastic portion contact the terminal of the partner connector when the terminal of the partner connector is housed in the fitting recessed portion, the side wall portion extends in the fitting direction, and contacts the elastic portion of the terminal, the elastic portion of the terminal and the side wall portion of the housing are elastically deformed together in the lateral direction when the terminal of the partner connector is inserted into the fitting recessed portion of the terminal, the connector includes a plurality of the terminals arrayed along a longitudinal direction of the connector, the side wall portion of the housing extends along the longitudinal direction so as to contact the elastic portions of the plurality of the terminals, the side wall portion has a slit portion, and the slit portion is formed between the elastic portions of the plurality of the terminals.

2. The connector according to claim 1, wherein the connector is fittable to the partner connector formed such that at least shapes of the first leg portion, the top portion, the second leg portion, the bottom portion, and the elastic portion of the terminal of the connector are substantially identical to those of the partner connector.

3. The connector according to claim 2, wherein the connector is fittable to the partner connector formed such that a shape of an entirety of the partner connector including the terminal and the housing is substantially identical to that of the connector.

4. The connector according to claim 3, wherein the housing further includes a protruding portion and a cutout portion, at an end portion of the connector in the longitudinal direction thereof, the protruding portion protrudes in the longitudinal direction and extends in the fitting direction, and the cutout portion is formed adjacent to the protruding portion, and the connector is fitted to the partner connector in such a manner that the protruding portion of the housing of the connector and the cutout portion of the housing of the partner connector engage with each other and the cutout portion of the housing of the connector and the protruding portion of the housing of the partner connector engage with each other.

5. The connector according to claim 4, wherein the housing further includes a holding wall, the holding wall holds the first leg portion, the top portion, and the second leg portion of the terminal, and a clearance is formed between an end portion of the holding wall in the longitudinal direction and the protruding portion.

6. The connector according to claim 1, wherein the terminal further includes a second mount portion, a portion of the bottom portion of the terminal on a side of the second direction forms the second mount portion.

7. The connector according to claim 1, wherein a position of the top portion of the terminal in the fitting direction and a position of an end portion of the elastic portion of the terminal on a side of the first direction in the fitting direction are substantially identical to each other.

8. The connector according to claim 1, wherein the connector includes a pair of the terminals arranged so as to symmetrically face each other in the lateral direction, and a pair of the housings arranged and coupled so as to symmetrically face each other in the lateral direction to hold the pair of the terminals, the side wall portions of the pair of the housings are apart from each other in the lateral direction, and the elastic portion of each of the pair of the terminals and the side wall portion of each of the pair of the housings are elastically deformable together in the lateral direction.

9. A connector assembly comprising:

a first connector which is the connector according to claim 1; and a second connector configured to be fittable to the first connector, wherein the first connector and the second connector are formed such that at least shapes of the first leg portion, the top portion, the second leg portion, the bottom portion, and the elastic portion of the terminal are substantially identical therebetween.

10. A connector comprising:

a terminal; and a housing holding the terminal, wherein the terminal includes a mount portion, a first leg portion, a top portion, a second leg portion, a bottom portion, and an elastic portion, the housing includes a side wall portion and a holding wall, the first leg portion is formed continuously to the mount portion, and extends in a first direction, which is one direction in a direction of fitting to a partner connector, from the mount portion, the top portion is formed continuously to the first leg portion, the second leg portion is formed continuously to the top portion, and extends in a second direction, which is opposite to the first direction in the fitting direction, from the top portion, the bottom portion is formed continuously to the second leg portion, the elastic portion is formed continuously to the bottom portion, extends in the first direction from the bottom portion, and is elastically deformable in a lateral direction of the connector, the terminal is configured to house a terminal of the partner connector in a fitting recessed portion formed by the second leg portion, the bottom portion, and the elastic portion, and the second leg portion and the elastic portion contact the terminal of the partner connector when the terminal of the partner connector is housed in the fitting recessed portion, the holding wall is formed so as to hold the first leg portion, the top portion, and the second leg portion in such a manner that a space surrounded by the first leg portion, the top portion, and the second leg portion of the terminal is filled, the side wall portion extends in the fitting direction, and contacts the elastic portion of the terminal, the connector includes a plurality of the terminals arrayed along a longitudinal direction of the connector, the side wall portion of the housing extends along the longitudinal direction so as to contact the elastic portions of the plurality of the terminals, the side wall portion has a slit portion, and the slit portion is formed between the elastic portions of the plurality of the terminals.

* * * * *